United States Patent
Charlton et al.

(10) Patent No.: US 6,314,765 B1
(45) Date of Patent: Nov. 13, 2001

(54) METHOD AND APPARATUS FOR CONTROLLING THE SHAPE AND POSITION OF A DEFORMABLE OBJECT

(75) Inventors: Roger Charlton, Newton; Daniel G. Fletcher, Conover; Charles A. Giebner, Hickory, all of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/168,391

(22) Filed: Oct. 6, 1998

(51) Int. Cl.$^7$ .................................................. C03B 37/07
(52) U.S. Cl. .................. 65/382; 65/376; 65/268; 65/292; 65/296; 65/491; 65/425
(58) Field of Search ............. 65/376, 382, 268, 65/292, 296, 491, 417, 425; 72/370.24, 370.25

(56) References Cited

U.S. PATENT DOCUMENTS

| | | | |
|---|---|---|---|
| 4,247,319 | * 1/1981 | Hofmann . | |
| 4,280,829 | 7/1981 | Sheth | 65/158 |
| 4,331,463 | 5/1982 | Briere et al. | 65/13 |
| 4,390,897 | 6/1983 | Smithgall, Sr. | 358/101 |
| 4,477,273 | * 10/1984 | Lynch et al. . | |
| 4,816,050 | * 3/1989 | Roba . | |
| 4,952,226 | 8/1990 | Frazee, Jr. et al. | 65/3.12 |
| 4,957,526 | 9/1990 | Frazee, Jr. et al. | 65/3.11 |
| 4,973,343 | 11/1990 | Frazee, Jr. et al. | 65/1 |
| 5,030,266 | * 7/1991 | Baltzer et al. . | |
| 5,192,350 | * 3/1993 | Le Sargent . | |
| 5,208,645 | 5/1993 | Inoue et al. | 356/73.1 |
| 5,221,306 | * 6/1993 | Fleming, Jr. et al. . | |
| 5,237,383 | 8/1993 | Parisi | 356/73.1 |
| 5,558,692 | * 9/1996 | Chervenak et al. . | |
| 5,968,221 | * 10/1999 | Blais . | |
| 6,123,067 | * 9/2000 | Warrick . | |

FOREIGN PATENT DOCUMENTS

| 4193732 | 7/1992 | (JP) . |
|---|---|---|
| 543264 | 2/1993 | (JP) . |

OTHER PUBLICATIONS

High–Speed Measurement and Control of Fiber–Coating Concentricity By: D.H. Smithgall & R.E. Frazee, May 19, 1981, pp. 2065–2080 The Bell System Technical Journal, Nov. 1981.

* cited by examiner

*Primary Examiner*—Michael Colaianni
(74) *Attorney, Agent, or Firm*—Ware, Fressola, Van Der Sluys & Adolphson LLP (57) ABSTRACT

A method and apparatus for controlling the shape and position of a deformable object are described. At least a portion of an object is heated to a temperature sufficient to render the heated portion deformable by a force. An image profile of the heated portion of the object is obtained. A controller compares the image profile to a reference profile and produces an error image signal. Based on the error image signal, an instruction signal is generated. A force applicator responsive to the instruction signal applies a radial force to at least one distinct predetermined location on the heated portion of the object in response to the instruction signal to cause the heated portion of the object to conform to the reference profile. The invention is particularly useful in controlling the shape of an optical fiber preform.

14 Claims, 9 Drawing Sheets

METHOD AND APPARATUS FOR CONTROLLING THE SHAPE AND POSITION OF A DEFORMABLE OBJECT

BACKGROUND OF THE INVENTION

1. Field of the Invention

The present invention relates generally to the controlling of the shape and position of a deformable object. More particularly, the present invention relates to an apparatus and a method for controlling the shape and position of an object that is deformable by the application of an outside force.

2. Discussion of Related Art

The present invention is particularly useful for controlling the shape and position of an optical fiber preform. In the prior art, it is known to control the diameter of an optical fiber preform during deposition of glassy layers therein by controlling the pressure within the bore of the preform. An example of such a method is given in U.S. Pat. No. 4,280,829. In such a method, during deposition of the glassy layers, a moving hot zone is generated within the preform while reactant gases flow through the bore of the preform in order to form uniform glassy deposits within the preform. An outer diameter monitor measures the diameter of the preform and provides a signal corresponding to the measured diameter to a controller. The controller compares the signal corresponding to the measured diameter to a set point and provides a control signal to a mass flow controller. By varying the flow of gas into the bore of the preform, the pressure within the preform is maintained at the level necessary to provide the desired preform diameter.

The prior art method has several deficiencies. Often, the locally heated portion of the preform becomes distorted and deviates from the desired shape in ways other than having a diameter which does not match the set point. Such distortion may include a non-circular cross section and/or the preform is not symmetrically disposed about the axis of rotation. Such distortion makes drawing an optical fiber from the preform difficult, if not impossible. Regulating the pressure of the gases within the bore of the preform will not correct these types of distortions.

SUMMARY OF THE INVENTION

Accordingly, it is an object of the present invention to provide a method for controlling the shape and position of an object, such as a cylindrical glass body.

The foregoing objective is realized by the apparatus according to the present invention which includes a heat source for heating at least a portion of the object to a temperature sufficient to render the heated portion deformable by a force, and one or more imaging devices for providing actual image signals corresponding to actual image profiles of the heated portion of the object within the field of view of the imaging devices. The apparatus also has a controller for receiving the actual image signals, for comparing the actual image signals to a reference image signal corresponding to a reference profile to obtain error image signals, and for providing an instruction signal based on the error image signals. Finally, the apparatus has a force applicator for applying a radial force to at least one distinct predetermined radial location on the heated portion of the object in response to the instruction signal to cause the heated portion of the object to conform to the reference profile.

The foregoing objective is also realized by the method of the present invention which begins by providing an object having an axis about which the object is rotated. A portion of the object is heated to a temperature sufficient to render the heated portion deformable by a force. The heated portion of the object is imaged radially by one or more imaging devices to obtain image profiles of the heated portion of the object, which are compared to a reference profile to obtain error profiles. Finally, a radial force is applied to at least one distinct predetermined radial location on the heated portion of the object in response to the error profiles to cause the heated portion of the object to conform to the reference profile.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

As described hereinafter, the present invention provides a method and apparatus for controlling the shape and position of a deformable object. The method and apparatus of the present invention are particularly useful for controlling the shape and position of an optical fiber preform, and therefore, the invention will be described in the context of forming an optical fiber preform. However, the present invention can also be used to control the shape and position of any type of deformable object.

Figure 1A:
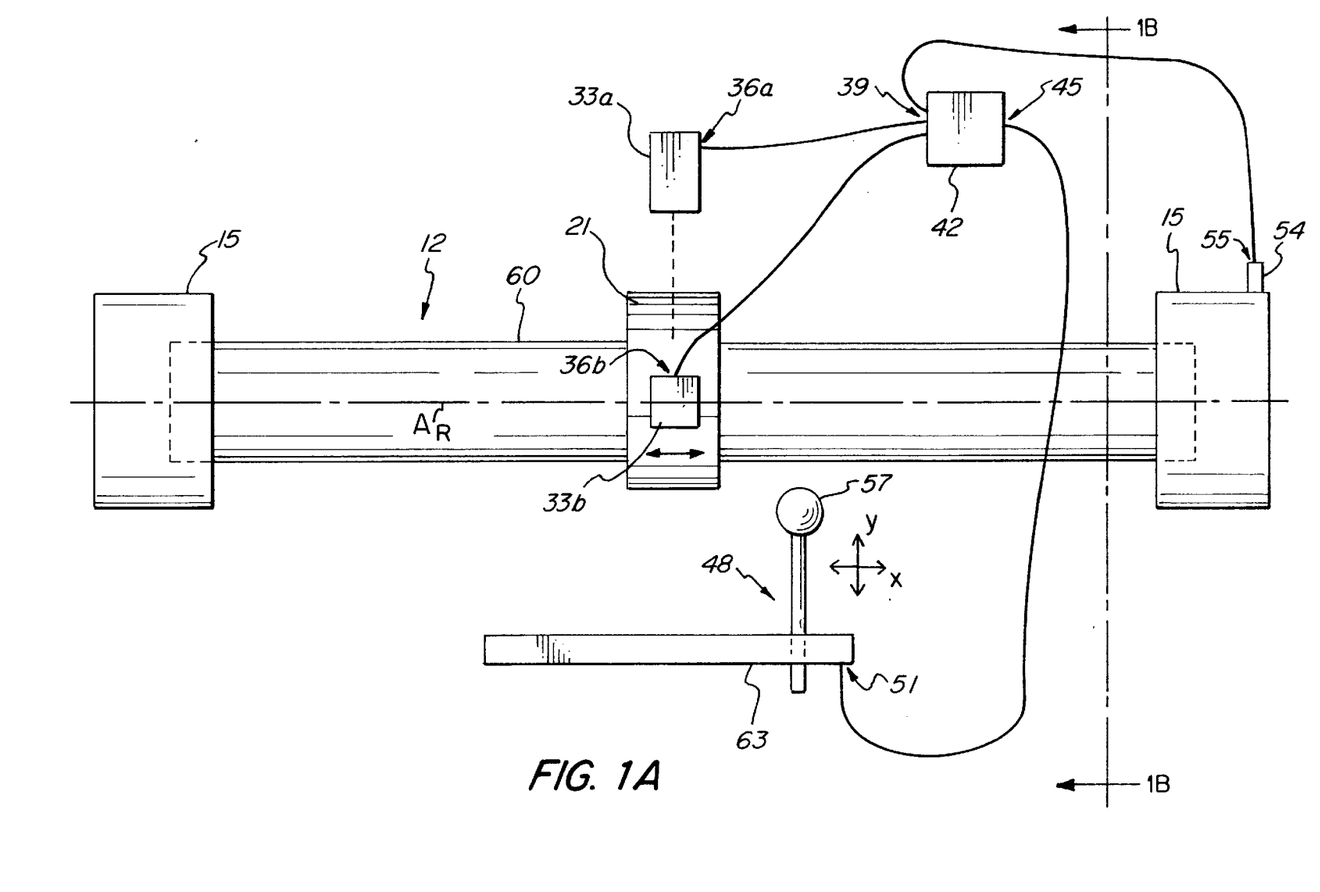
FIG. 1A is a side view of an apparatus according to the present invention.
Figure 1B:
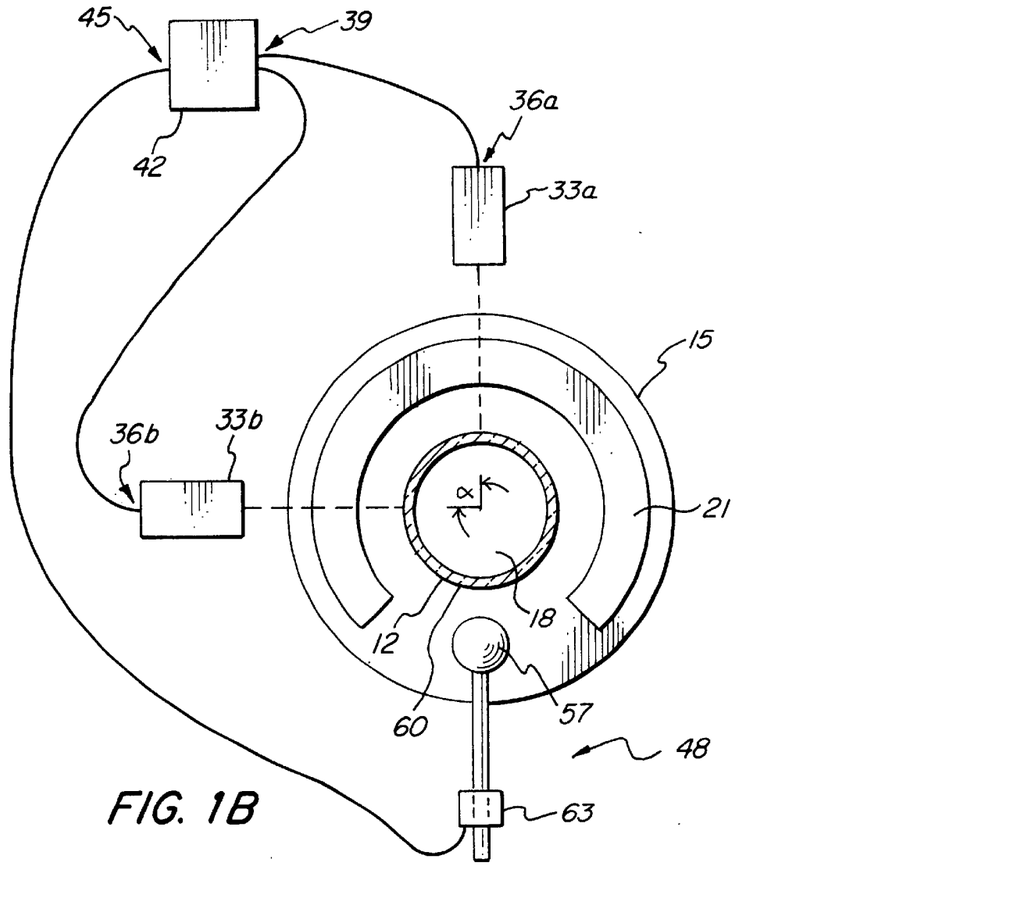
FIG. 1B is a cross sectional view of the apparatus shown in FIG. 1A taken along the line 1B—1B.

FIGS. 1A and 1B show a glass body 12 (or preform) mounted in chucks 15 of a lathe (not shown). The glass body 12 is usually mounted so that its longitudinal axis is perpendicular to the force of gravity, but it is also possible to have the longitudinal axis parallel to the force of gravity. The lathe and chucks 15 rotate the glass body 12 about an axis $A_R$ while supplying a mixture of deposition gases to the bore 18. A movable heat source 21, such as a burner or resistance heater, surrounds at least a portion of the glass body 12 to provide heat needed to cause the gases to react and deposit on the glass body 12. The heat source 21 may also completely surround the glass body 12. The heat provided by the heat source 21 to make the gasses react also renders the glass deformable by the application of an outside force.

FIGS. 1A and 1B show imaging devices 33a, 33b, either of which may be a video camera positioned proximate to the glass body. Each imaging device 33a, 33b has an output 36a, 36b for providing an actual image signal corresponding to an actual image profile of the heated portion of the glass body 12 observed within their respective fields of view. FIG. 4B illustrates the actual image profile 27 of the glass body 12 within the field of view 30 of one of the imaging devices 33a. Imaging apertures (not shown) are provided in the heat source 21 to enable each imaging device 33a, 33b to have an unobstructed view of the glass body 12. The imaging device outputs 36a, 36b are connected to an input 39 of a controller 42 to enable the controller 42 to receive the actual image signals from the imaging devices 33a, 33b.

The controller 42 also has a central processing unit (not shown) that executes a program for comparing the actual image signals to a reference image signal corresponding to a reference profile 24 (FIGS. 4A and 4B) to obtain error image signals. Based upon the error image signals resulting from the comparison, the program provides an instruction signal at controller output 45. The controller 42 may comprise a commercially available personal computer. The program executed by the central processing unit of the controller 42 follows the method steps of the present invention as further described below.

The apparatus shown in FIGS. 1A and 1B also has a force applicator 48 which is capable of providing a radially directed force to at least one distinct predetermined radial location on the heated portion of the glass body 12. The force applicator 48 includes an input 51 connected to the controller output 45 for receiving the instruction signal. The force applicator 48 applies the radial force in response to the instruction signal to cause the heated portion of the glass body 12 to conform to the reference profile 24 (shown in FIGS. 4A and 4B).

In the embodiment of the apparatus depicted in FIG. 1A, the force applicator 48 includes a solid contact body 57 for contacting an external surface 60 of the glass body 12 and a positioning stage 63 to which the contact body 57 is mounted. The positioning stage 63 may be driven by pneumatics, hydraulics or motors. The solid contact body 57 shown in FIGS. 1A and 1B is spherical, but may be made to have any desired shape. The positioning stage 63 is capable of controlling the location of the force applied to the glass body 12 by moving the solid contact body 57 in the directions x-y shown in FIG. 1A, and is also capable of applying the amount of force, as directed by the instruction signal, necessary to conform the glass body 12 into a desired shape and position.

The apparatus shown in FIGS. 1A and 1B has two imaging devices 33a, 33b, but more than two imaging devices may be used to instantaneously view the entire circumference of the glass body 12. Although only two imaging devices 33a, 33b will not instantaneously view the entire circumference of the glass body 12, the two imaging devices 33a, 33b can give enough instantaneous information about the shape and position of the glass body 12 to properly apply the conforming radial force. When the apparatus of the present invention is provided with only two imaging devices 33a, 33b, it is preferred that the imaging devices 33a, 33b are oriented at an angle α which is equal to about 90°, as shown in FIG. 1B. It will be apparent to those skilled in the art that an angle α equal to 90° is the optimum angle for stereoscopic separation, i.e. more accurate information will be provided regarding the position of the glass body 12 with respect to the axis of rotation $A_R$ than if α were not 90°.

The apparatus according to the present invention may also have only one imaging device, such as imaging device 33a. When only one imaging device is provided, the apparatus includes an angular position sensor 54 having an output 55 connected to the controller input 39. The angular position sensor 54, such as a position encoder, provides angular position signals corresponding to the angular position of the glass body 12 relative to the imaging device 33a. The angular position signals enable the controller 42 to correlate each image signal in a series of image signals with a corresponding angular position of the glass body 12 in order to obtain enough information about the shape and position of the glass body 12 to properly apply the force. The controller 42 is provided with a memory for storing the image signal corresponding to each angular position until needed to determine the shape and position of the glass body, and eventually to determine the proper instruction signal to be provided to the force applicator 48.

Figure 2:
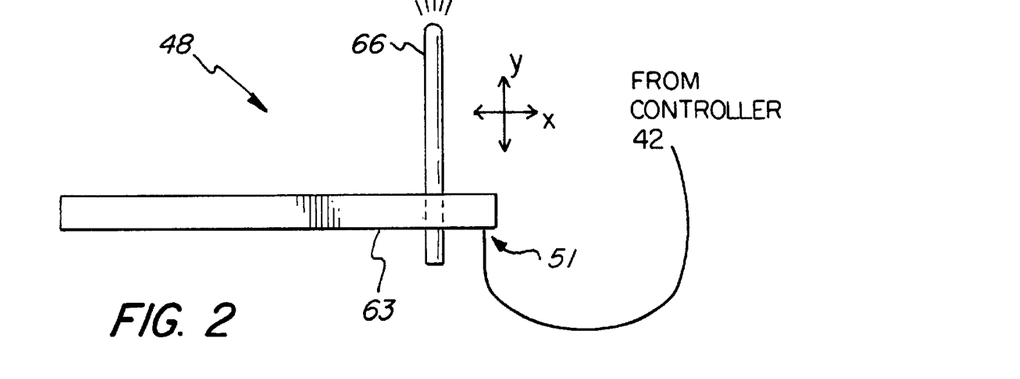
FIG. 2 is a side view of a force applicator according to the present invention.

FIG. 2 depicts an alternative embodiment of the force applicator 48 which is comprised of a gas nozzle 66 which directs compressed gas at the predetermined location on the glass body 12. Like the solid contact body 57 shown in FIGS. 1A and 1B, the nozzle 66 is shown mounted on the positioning stage 63 for controlling the location of the nozzle 66 and the gas stream resulting therefrom. To control the amount of force applied to the glass body 12, either the distance between the nozzle 66 and the glass body 12 may be adjusted by the positioning stage 63, or the flow rate of the gas may be adjusted by a regulator (not shown).

Figure 3A:
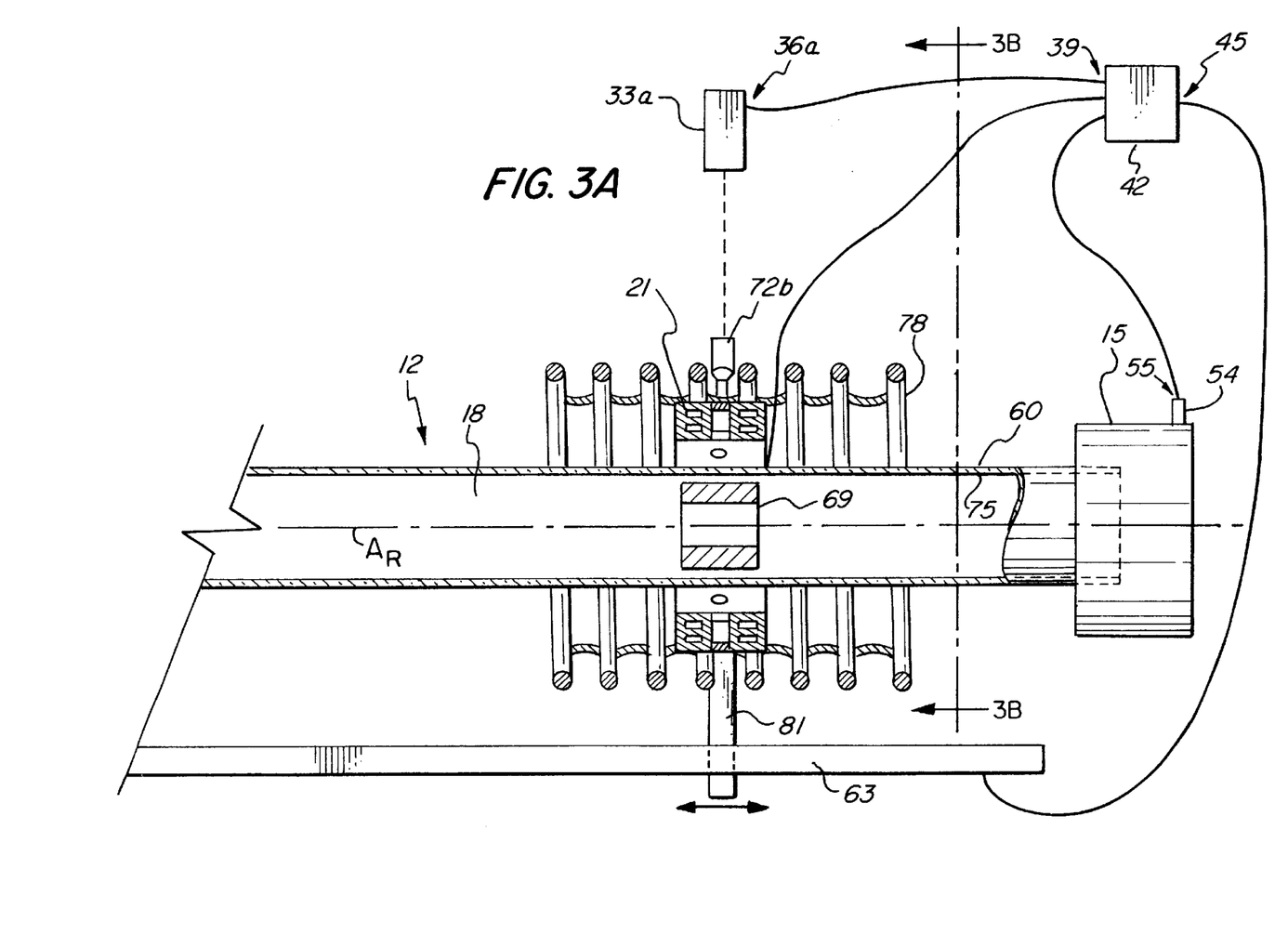
FIG. 3A is a cross-sectional side view of another apparatus according to the present invention.
Figure 3B:
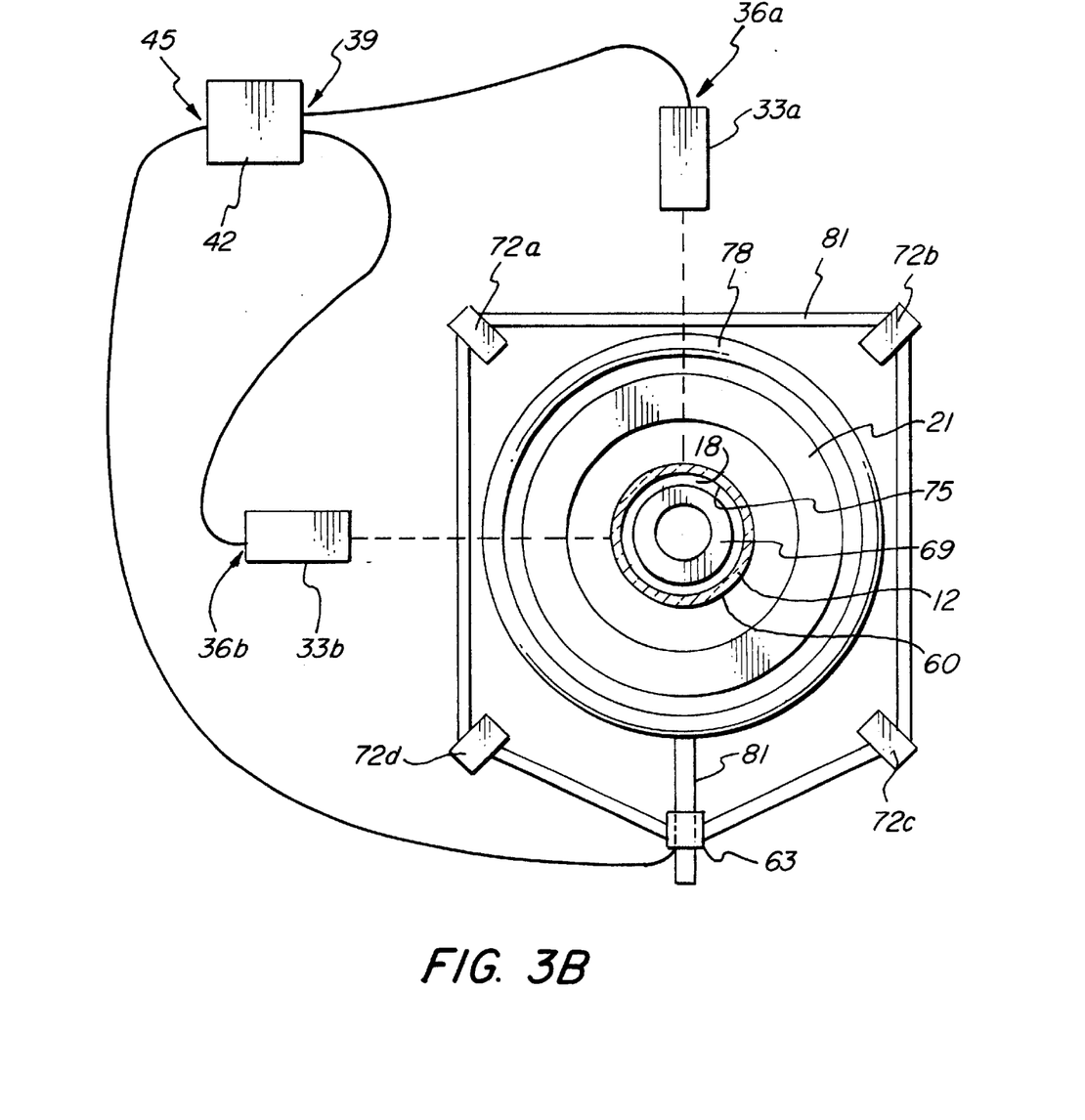
FIG. 3B is a cross-sectional view of the apparatus shown in FIG. 3A taken along the line 3B—3B.

FIGS. 3A and 3B show another embodiment of the present invention in which the force applicator is formed, in part, by a magnetic body 69 disposed within the bore 18 of the tubular glass body 12. The magnetic body 69 may have a cylindrical shape, but the present invention is not limited to such a shape. The force applicator shown in FIGS. 3A and 3B also includes electromagnets 72a–72d radially disposed about the glass body 12 to controllably cause the magnetic body 69 to physically contact an internal surface 75 of the glass body 12 by varying one or more of the magnetic fields provided thereby. If the glass body 12 is oriented so that its longitudinal axis is parallel to the force of gravity, a magnetic coil 78 connected to a source of direct electrical current (not shown) may be included in the apparatus to keep the magnetic body 69 properly positioned in the heated portion of the glass body 12 by providing a force on the magnetic body 69 countering the force of gravity. Also shown in FIGS. 3A and 3B is an optional frame 81 for moving the heat source 21, magnetic coil 78 and electromagnets 72a–72d as one unit by the positioning stage 63.

Figure 4A:
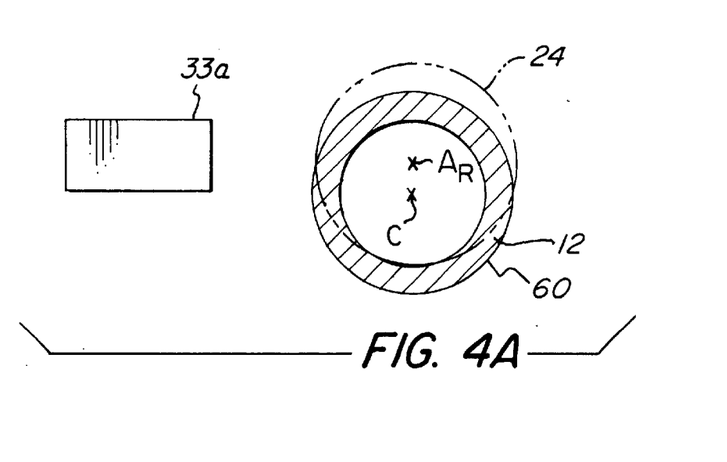
FIG. 4A is a cross sectional view of the glass body, the reference position, and an imaging device.
Figure 4B:
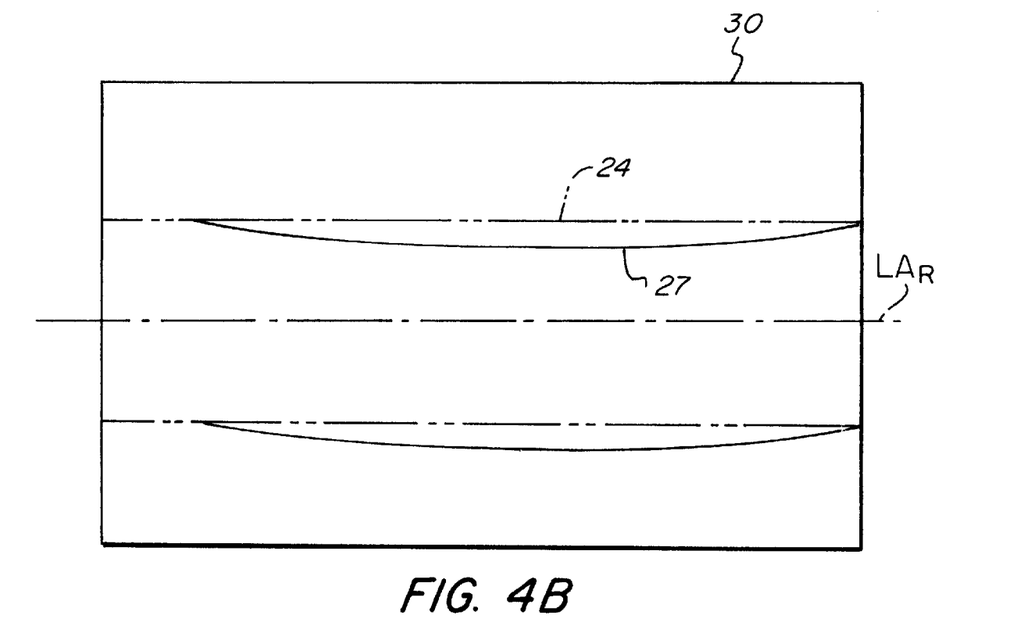
FIG. 4B is the field of view of the imaging device shown in FIG. 4A.

The apparatus of the present invention is capable of controlling the types of distortion depicted in FIGS. 4A through 4F, which can occur during heating of the glass body 12. In FIG. 4A the glass body 12 is shown in cross section adjacent to imaging device 33a. relative to a reference profile 24, which shows the desired position of the external surface 60 of the glass body 12. The field of view 30 of the imaging device 33a. is shown in FIG. 4B. As shown in FIGS. 4A and 4B, the geometric center C of the glass body 12 is not aligned with the axis of rotation $A_R$, thereby causing a difference between the actual image profile 27 and the reference profile 24. The difference between the actual image profile 27 and the reference profile 24 is the error profile. The program included with the controller 42 for comparing the actual image signal to a reference image signal may effectively compare the actual image profile 27, which corresponds to the actual image signal, to the reference profile 24, which corresponds to the reference image signal, to obtain the error profile used to provide the instruction signal at the controller output 45.

Figure 4C:
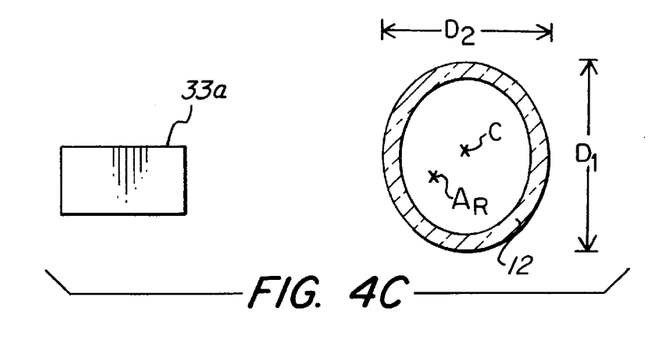
FIG. 4C is a cross sectional view of a glass body which has an elliptical cross section and which has a geometric center located off of the axis of rotation.
Figure 4D:
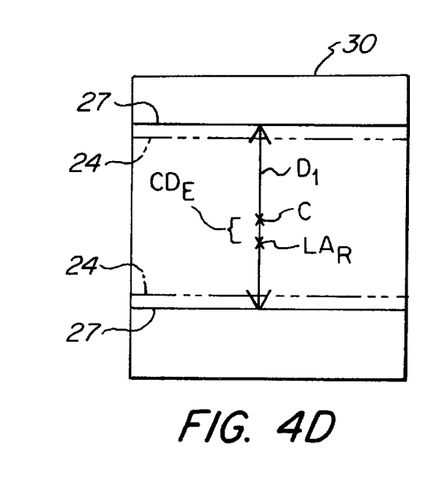
FIG. 4D is the field of view of the imaging device shown in FIG. 4C.
Figure 4E:
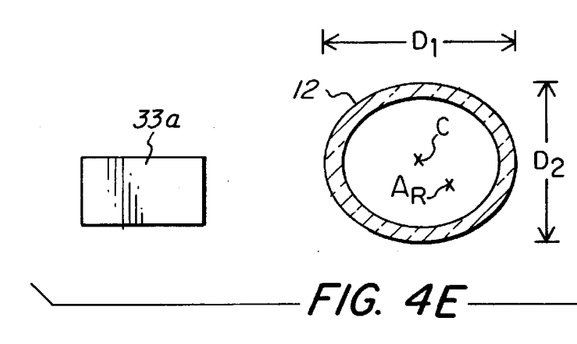
FIG. 4E is a cross sectional view of the glass body shown in FIG. 4C after rotation about the axis of rotation.
Figure 4F:
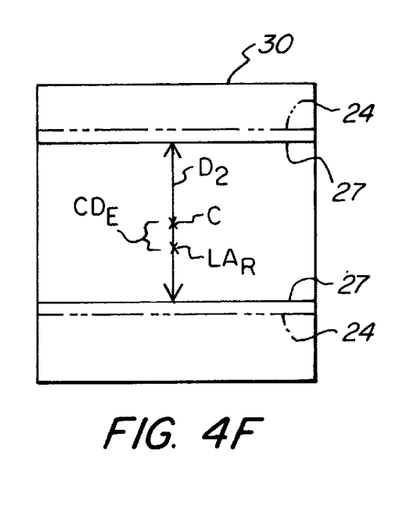
FIG. 4F is the field of view of the imaging device shown in FIG. 4E.

FIGS. 4C and 4E also depict a glass body 12 wherein the geometric center C is not aligned with the axis of rotation $A_R$. As shown in FIGS. 4D and 4F, the center distance error $CD_E$ is the distance between the center C of the diameter $D_1$ or $D_2$. and the reference longitudinal axis LAR, which in this case corresponds to the axis of rotation $A_R$. The glass body 12 shown in FIGS. 4C and 4E also exhibits another type of distortion. As shown in FIGS. 4C and 4E, the diameter $D_1$ is greater than the diameter $D_2$, and so the cross section of the glass body 12 is not circular. The program associated with the controller 42 may include a program module for comparing the length of the diameter $D_1$ or $D_2$. at an axial location on the glass body 12 to a desired diameter length to obtain a diameter length error, and may also include a program module for comparing the distance between the center C of the diameter $D_1$ or $D_2$. to a desired diameter center distance to obtain a diameter center distance error. The diameter length error and the diameter center distance error then become the error image signals used to generate the instruction signal provided at the controller output 45.

Figure 5:
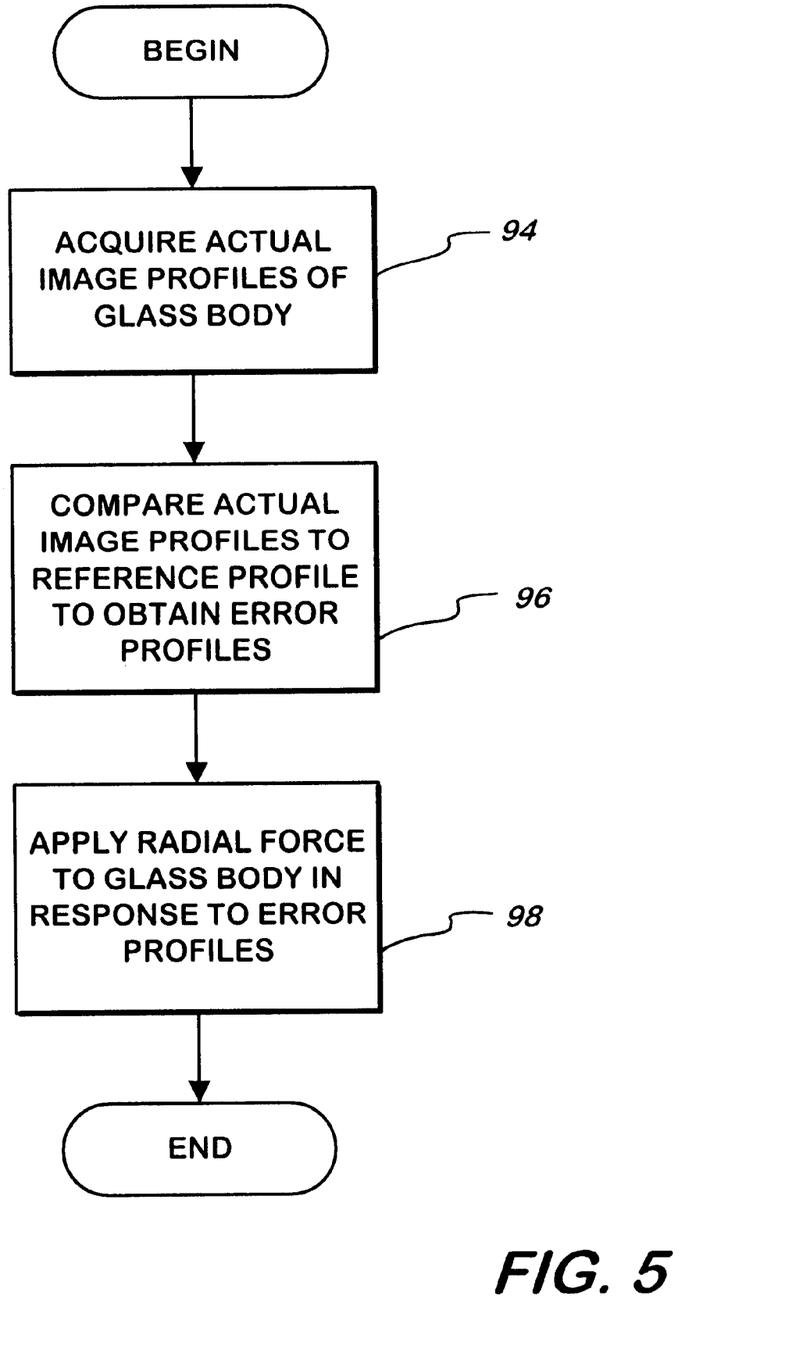
FIG. 5 shows the primary steps of a method according to the present invention.

The method of the present invention controls and corrects such distortions, and may be used in the apparatus described above according to the present invention. FIG. 5 illustrates the primary steps of a method for controlling the shape and position of a cylindrical glass body 12 according to the present invention. In the method, a portion of the glass body 12 is heated to a temperature sufficient to render the heated portion deformable by a force. Then, the heated portion of the glass body 12 is imaged radially by the imaging devices 33a, 33b. to obtain a first and a second actual image profile of the heated portion of the glass body 12 (step 94). The actual image profiles are compared to the reference profile 24 by the program residing in the controller 42 to obtain first and second error profiles (step 96). The glass body 12 may be rotated by the chucks 15 of the lathe to a predetermined angle, if necessary, to bring at least one distinct predetermined radial location on the heated portion of the glass body 12 adjacent to the force applicator 48. Then, a radial force can be applied to the predetermined radial location on the heated portion of the glass body 12 in response to the instruction signal corresponding to the error profiles (step 98) to cause the shape and position of the heated portion of the glass body 12 to change so as to conform with the shape and position of the reference profile 24.

Figure 6:
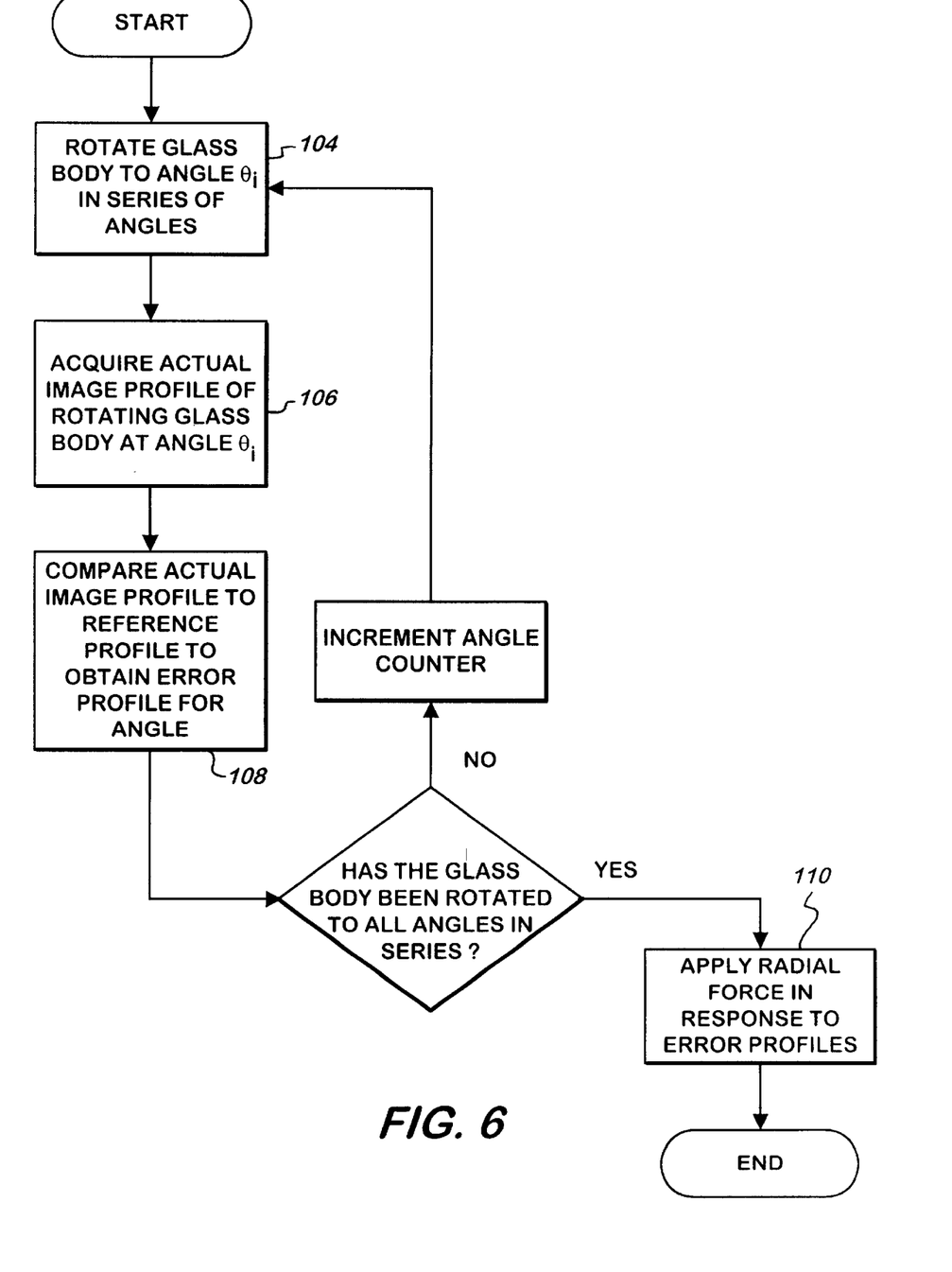
FIG. 6 shows the primary steps of another method according to the present invention.

FIG. 6 illustrates the steps of an alternative embodiment of the method according to the present invention. In this alternative method, the glass body 12 is rotated to an angle $\theta_i$ (step 104) by the chucks 15 of the lathe while being heated to a temperature sufficient to render the heated portion deformable by a force, and then the heated portion of the glass body 12 is imaged radially with an imaging device, such as imaging device 33a, at a predetermined axial location (step 106). The actual image profile is compared to a reference profile to obtain an error profile for the angle $\theta_i$ (step 108). Then steps 104–108 are repeated for each angle in a series of angles. Once steps 104–108 have been performed for each angle in the series, the controller 42 then determines the location and amount of force to be applied to the glass body 12 based on the error profiles, sends an instruction signal based on the error profiles to the force applicator 48, which in turn applies a radial force to the glass body 12 (step 110) to conform the shape and position of the glass body 12 to the shape and position of the reference profile.

Figure 7:
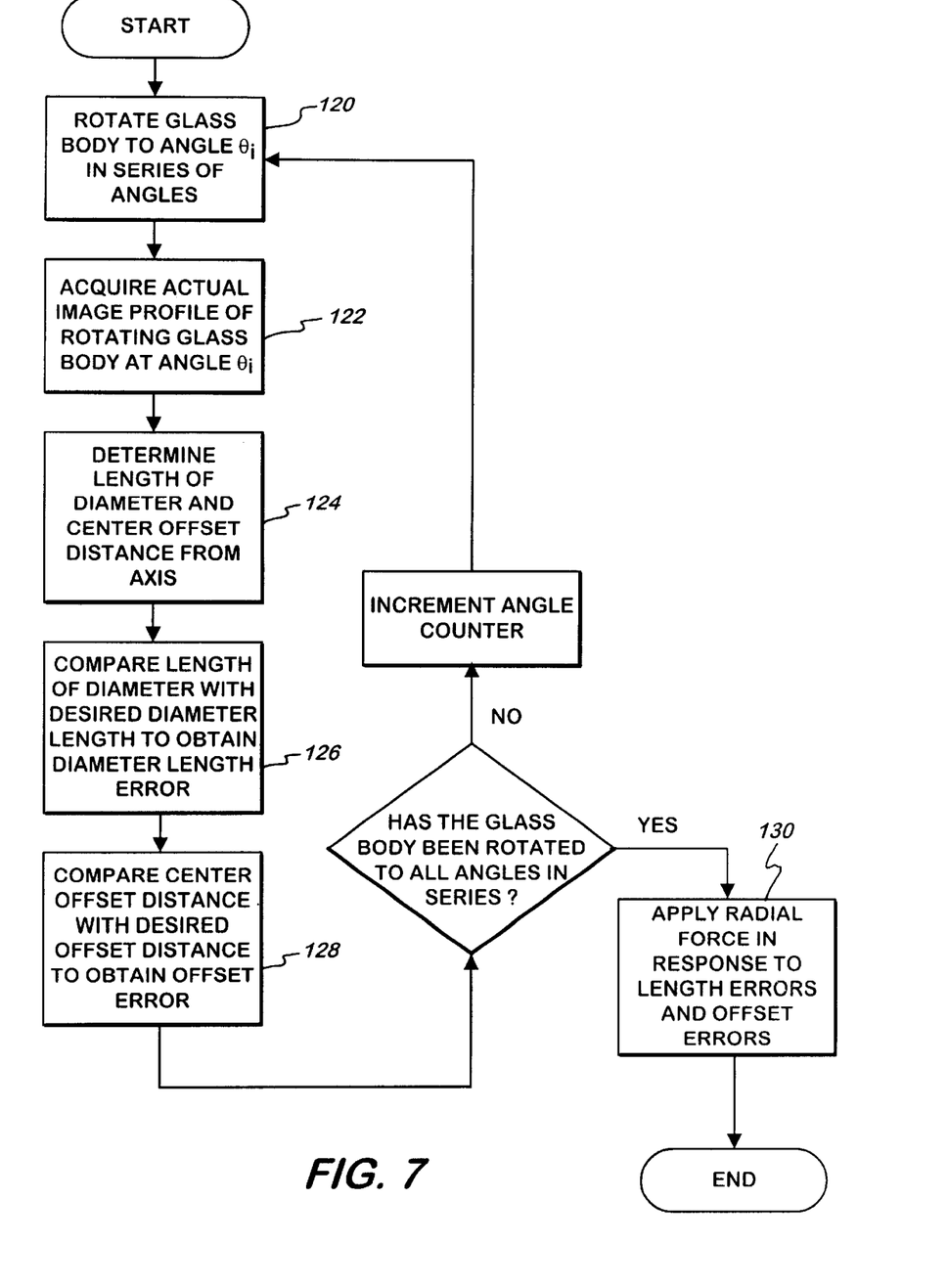
FIG. 7 shows the primary steps of another method according to the present invention.

Alternatively, as illustrated in FIG. 7, the glass body 12 may be rotated to an angle $\theta_i$ (step 120) and imaged at angle $\theta_i$ at an axial location (step 122). Then the length of the diameter $D_1$ or $D_2$. of the glass body 12 at the axial location and a distance $CD_E$ between the center C of the diameter $D_1$ or $D_2$. of the glass body 12 at the axial location and the longitudinal reference axis $LA_R$ (step 124) is determined by the controller 42. Next, the determined length of the diameter $D_1$. or $D_2$. at the axial location is compared with a desired diameter length to obtain a diameter length error (step 126), and the determined distance $CD_E$ between the center C of the diameter $D_1$ or $D_2$ and the reference axis $LA_R$ is compared to a desired diameter center distance by the controller 42 to obtain a diameter center distance error (step 128) for that angle. Steps 120–128 are then repeated for a series of angles. After the steps 120–128 have been performed for each angle in the series, the diameter length errors and the diameter center distance errors are compared to respective thresholds by the controller 42, and if any of the errors exceeds its respective threshold, the glass body 12 is rotated to bring a predetermined location on the glass body 12 adjacent to the force applicator so that a predetermined radial force can be applied to the glass body 12 at a predetermined axial location in response to the error (step 130) to cause the glass body 12 to conform to the desired diameter length and the desired diameter center distance.

It will be apparent to those skilled in the art that the methods of the present invention can be repeated more than once. Also, the methods of the present invention may be repeated incrementally numerous times until the glass body 12 is conformed to the desired shape and position.

Although the present invention has been described with respect to one or more particular embodiments of the device, it will be understood that other embodiments of the present invention may be made without departing from the spirit and scope of the present invention. Hence, the present invention is deemed limited only by the appended claims and the reasonable interpretation thereof.

What is claimed is:
1. A method for manipulating the position and size of a diameter of a heated, rotating object, the method comprising the steps of:
   providing an object having an axis;
   rotating the object about its axis through a series of angles;
   heating at least a portion of the object to a temperature sufficient to render the heated portion deformable by a force;
   providing an imaging device;
   imaging the heated portion of the object radially with the imaging device at a predetermined axial location within the heated portion to determine a length of the diameter of the object at the axial location and to determine a distance between the center of the diameter of the object at the axial location and the axis for each angle in the series;
   comparing the determined length of the diameter at the axial location with a desired diameter length to obtain a diameter length error for each angle in the series;

comparing the determined distance between the center of the diameter and the axis to a desired diameter center distance to obtain a diameter center distance error for each angle in the series;

applying a predetermined radial force to at least one distinct predetermined radial location on the object at the predetermined axial location to cause the object to conform to the desired diameter length and the desired diameter center distance based upon the determined diameter length errors and the determined diameter center distance errors.

2. The method of claim 1 wherein the step of applying a predetermined radial force to the object is performed by providing a solid contacting body and physically contacting an external surface of the object with the solid contacting body.

3. The method of claim 1 wherein the step of applying a predetermined radial force to the object is performed by directing a stream of gas at an external surface of the object.

4. The method of claim 1 wherein the object is a tube having an internal surface which defines a bore, and wherein the step of applying a predetermined radial force to the object is performed by physically contacting the internal surface of the object with a solid body.

5. The method of claim 1 wherein the object is a tube having an internal surface which defines a bore, and wherein the method further comprises providing a magnetic field proximate to the object and providing a solid magnetic body within the bore, and wherein the step of applying a radial force to the object is performed by adjusting the magnetic field to cause the magnetic body to physically contact the internal surface of the object.

6. The method of claim 5 wherein multiple magnetic fields are provided proximate to the object for applying the radial force.

7. An apparatus for conforming the profile of a rotating, heated object to a reference profile, apparatus comprising:

means for rotating the object;

means for heating at least a portion of the object to a temperature sufficient to render the heated portion deformable by a force;

an imaging device having a field of view, the imaging device having an output for providing a series of actual image corresponding to image profiles of the heated portion of the object within the field of view, said actual image signals containing information about the shape and location of the heated portion of the object;

an angular sensor having an output for providing a series of angular position signals corresponding to the angular positions of the object for each of the actual image signals;

a controller having an input connected to the imaging device output for receiving the series of actual image signals and connected to the angular sensor output for receiving the angular position signal, an output, and means for comparing the actual image signals to a reference image signal to obtain a series of error image signals, the controller also having means for providing an instruction signal based on the series of error image signals at the controller output, said reference image signal containing information about the shape and location of the heated portion of the object; and means, having an input connected to The output of the controller, for applying a radial force to at least one distinct predetermined radial location on the heated portion of the object in response to the instruction signal to cause the heated portion of the object to conform to the reference profile;

wherein the object is a tube having an internal surface which defines a bore, and wherein the means for applying a radial force physically contacts the internal surface of the object and includes a magnetic body disposed within the bore, and further includes means for generating one magnetic field proximate to the object to controllably cause the magnetic body to physically contact the internal surface of the object.

8. The apparatus of claim 7 wherein the magnetic body has a generally cylindrical cross-section.

9. The apparatus of claim 7 wherein the object is a tube having an integral surface which defines a bore, and wherein the means for physically contacting includes a magnetic body disposed within the bore, and further includes means for generating a plurality of magnetic fields proximate to the object to controllably cause the magnetic body to physically contact the internal surface of the object.

10. The apparatus of claim 7, wherein the angular sensor is a position encoder.

11. A method for controlling the profile of a rotating tube having an internal surface which defines a bore comprising:

providing a tube having an internal surface which defines a bore and having an axis;

rotating the tube about its axis through a series of angles;

heating at least a portion of the tube to a temperature sufficient to render the heated portion deformable by a force;

providing an imaging device;

imaging the heated portion of the tube radially with the imaging device to obtain an image profile of the heated portion of the tube for each angle in the series;

comparing each image profile to a reference profile to obtain an error profile for each angle in the series;

providing a magnetic field proximate to the tube and providing a solid magnetic body within the bore; and applying a radial force to at least one distinct predetermined radial location on the heated portion of the tube by adjusting the magnetic field to cause the magnetic body to physically contact the internal surface of the tube in response to the error profiles to cause the heated portion of the tube to conform to the reference profile.

12. The method of claim 11 wherein multiple magnetic fields are provided proximate to the object for applying the radial force.

13. A method for controlling the profile of a rotating object comprising:

providing an object having an axis;

rotating the object about its axis through a series of angles, heating at least a portion of the object to a temperature sufficient to render the heated portion definable by a force;

providing an imaging device;

imaging the heated portion of the object radially with the imaging device to obtain an image profile containing information about the shape and location of the heated portion of the object for each angle in the series;

comparing each image profile to a reference profile containing information about the shape and location of the heated portion of the object to obtain an error profile for each angle in the series; and applying a radial force to at least one distinct predetermined radial location on the heated portion of the object in response to the error profiles to cause the heated portion of the object to conform to the reference profile;

wherein the object is a tube having an internal surface which defines a bore, and wherein the method further comprises providing a magnetic field proximate to the object and providing a solid magnetic body within the bore, and wherein the step of applying a radial force to the object is performed by adjusting the magnetic field to cause the magnetic body to physically contact the internal surface of the object.

14. The method of claim 13 wherein multiple magnetic fields are provided proximate to the object for applying the radial force.

* * * * *